UNITED STATES PATENT OFFICE 2,491,442

ESTERS OF 2-CYCLOHEXENE-1-CAPROIC ACID

Gerald H. Coleman, Freeland, Mich., assignor to The Dow Chemical Company, Midland, Mich., a corporation of Delaware No Drawing. Application January 8, 1949, Serial No. 69,989

4 Claims. (Cl. 260—468)

The present invention is related to a novel group of ester compounds and is particularly concerned with esters of 2-cyclohexene-1-caproic acid having the formula

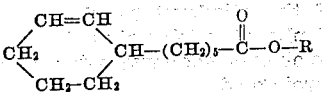

wherein R represents an alkylcyclohexyl, cyclohexylcyclohexyl or phenylcyclohexyl radical.

These new esters are mostly water-white liquids, insoluble in water and soluble in many organic solvents. They are valuable as intermediates for the preparation of more complex organic derivatives, as modifiers in plastic compositions, and as parasiticide toxicants.

The new compounds are prepared by reacting the methyl ester of 2-cyclohexene-1-caproic acid with an alkylcyclohexanol, cyclohexylcyclohexanol or phenylcyclohexanol, preferably in the presence of a small amount of aluminum ethoxide or powdered iron as catalyst. Substantially equimolecular proportions of the methyl 2-cyclohexene-1-caproate and substituted cyclohexanol have been found to give the desired esters in good yield. The reaction is carried out at the boiling temperature of the reaction mixture and under reflux. When the reaction is complete, the crude mixture is fractionally distilled under reduced pressure to obtain the desired ester product in substantially pure form.

The methyl 2-cyclohexene-1-caproate, employed as a starting material, may be prepared by reacting 2-cyclohexene-1-caproic acid with a large molecular excess of methyl alcohol. The reaction is carried out at the boiling temperature of the reaction mixture and under reflux. When the reaction is complete, the crude mixture is fractionally distilled to obtain the methyl 2-cyclohexene-1-caproate. This product boils at 103° C. at 2 millimeters pressure and has a specific gravity of 0.958 at 20°/4° C.

2-cyclohexene-1-caproic acid may be prepared by the oxidation of cyclohexanol. In a representative preparation, 5 moles of anhydrous sodium hydroxide, 5 moles of anhydrous potassium hydroxide, and 0.43 mole of caproic acid were mixed and heated to fusion. The fused mixture was stirred continuously and maintained at about 300° C. while 13.28 moles of cyclohexanol was added portionwise thereto. The mixture was then cooled, dissolved in water, and steam distilled to remove traces of cyclohexanol and low boiling by-products. The residual aqueous layer was evaporated to about 3 liters volume and acidified with hydrochloric acid to liberate the organic acid reaction products as a water-immiscible layer. This layer was separated and fractionally distilled under vacuum whereby there was obtained 4.113 moles of 2-cyclohexene-1-caproic acid. This compound boils at 195°–198° C. at 38 millimeters pressure and has a specific gravity of 0.9861 at 20°/4° C.

The following examples illustrate the invention but are not to be construed as limiting the same.

*Example 1.—The 2-cyclohexylcyclohexyl ester of 2-cyclohexene-1-caproic acid*

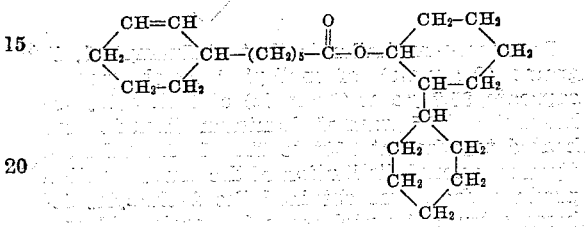

42 grams (0.2 mole) of methyl 2-cyclohexene-1-caproate, 36.4 grams (0.2 mole) of 2-cyclohexylcyclohexanol, and 0.1 gram of aluminum ethoxide were mixed together and heated for 10 hours at a temperature of from 200° to 250° C. and under reflux. The crude product was then fractionally distilled under reduced pressure to obtain the 2-cyclohexylcyclohexyl ester of 2-cyclohexene-1-caproic acid as a water-white liquid boiling at 275° C. at 18 millimeters pressure and having a specific gravity of 0.980 at 25°/25° C. This compound was soluble in petroleum distillate and carbon tetrachloride and insoluble in water.

*Example 2.—The 4-cyclohexylcyclohexyl ester of 2-cyclohexene-1-caproic acid*

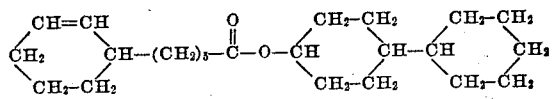

In a similar manner, 42 grams (0.2 mole) of methyl 2-cyclohexene-1-caproate, 36.4 grams (0.2 mole) of 4-cyclohexylcyclohexanol and 0.1 gram of aluminum ethoxide were heated together for 3 hours at a temperature of from 275° to 300° C. Upon fractional distillation of the crude reaction mixture, there was obtained the 4-cyclohexylcyclohexyl ester of 2-cyclohexene-1-caproic acid as a water-white liquid boiling at 275° C. at 10 millimeters pressure and having a specific gravity of 0.991 at 25°/25° C. This produce was insoluble in water and 95 per cent ethanol and soluble in carbon tetrachloride and petroleum distillate.

*Example 3.—4-methylcyclohexyl ester of 2-cyclohexene-1-caproic acid*

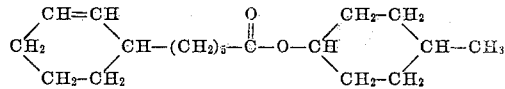

42 grams (0.2 mole) of methyl 2-cyclohexene-1-caproate, 22.8 grams (0.2 mole) of 4-methylcyclohexanol and 3 grams of powdered iron were mixed together and heated at 200° to 225° C. for 12 hours and under reflux. The crude product was filtered and the filtrate fractionally distilled under reduced pressure to obtain the 4-methylcyclohexyl ester of 2-cyclohexene-1-caproic acid as a water-white liquid boiling at 205° to 215° C. at 10 millimeters pressure and having a specific gravity of 0.958 at 25°/25° C. This product was soluble in petroleum distillate, carbon tetrachloride and 95 per cent ethanol, and insoluble in water.

*Example 4.—2-phenylcyclohexyl ester of 2-cyclohexene-1-caproic acid*

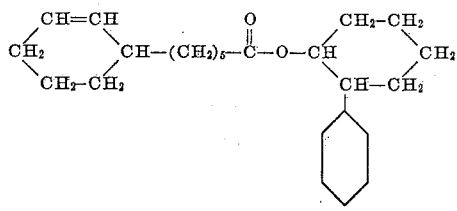

In a manner similar to that of Example 1, 42 grams (0.2 mole) of methyl 2-cyclohexene-1-caproate, 35.2 grams (0.2 mole) of 2-phenylcyclohexanol and 0.5 gram of aluminum ethoxide were heated together at 260° to 270° C. for 8 hours. Upon fractional distillation of the crude reaction product, there was obtained the 2-phenylcyclohexyl ester of 2-cyclohexene-1-caproic acid as a water-white liquid boiling at 223° to 225° C. at 3 millimeters pressure and having a specific gravity of 1.014 at 25°/25° C. This product was insoluble in water and soluble in carbon tetrachloride and petroleum distillate.

In a similar manner, other esters of 2-cyclohexene-1-caproic acid may be prepared of which the following are representative.

The 2-methylcyclohexyl ester of 2-cyclohexene-1-caproic acid by heating methyl 2-cyclohexene-1-caproate and 2-methylcyclohexanol with aluminum ethoxide.

The 2,4-dimethylcyclohexyl ester of 2-cyclohexene-1-caproic acid by heating methyl 2-cyclohexene-1-caproate and 2,4-dimethylcyclohexanol with aluminum ethoxide.

The 4-tertiary butylcyclohexyl ester of 2-cyclohexene-1-caproic acid by heating methyl 2-cyclohexene-1-caproate and 4-tertiary butylcyclohexanol with aluminum ethoxide.

I claim:
1. An ester having the formula

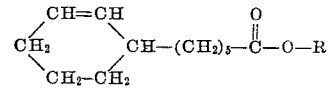

wherein R represents a member of the group consisting of the alkylcyclohexyl, cyclohexylcyclohexyl and phenylcyclohexyl radicals.

2. 4-cyclohexylcyclohexyl ester of 2-cyclohexene-1-caproic acid.

3. 2-cyclohexylcyclohexyl ester of 2-cyclohexene-1-caproic acid.

4. 4-phenylcyclohexyl ester of 2-cyclohexene-1-caproic acid.

GERALD H. COLEMAN.

REFERENCES CITED

The following references are of record in the file of this patent:

UNITED STATES PATENTS

| Number | Name | Date |
| --- | --- | --- |
| 2,352,746 | Wasum | July 4, 1944 |
| 2,396,013 | Jones et al. | Mar. 5, 1946 |
| 2,441,183 | Bludworth et al. | May 11, 1948 |